(12) United States Patent
Azam et al.

(10) Patent No.: US 11,069,332 B2
(45) Date of Patent: Jul. 20, 2021

(54) INTERFERENCE GENERATION

(71) Applicant: HEWLETT-PACKARD DEVELOPMENT COMPANY, L.P., Spring, TX (US)

(72) Inventors: Syed S Azam, Houston, TX (US); Paul J Broyles, III, Houston, TX (US); Humberto M Fossati, Houston, TX (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/482,280

(22) PCT Filed: Jul. 28, 2017

(86) PCT No.: PCT/US2017/044297
§ 371 (c)(1),
(2) Date: Jul. 31, 2019

(87) PCT Pub. No.: WO2019/022750
PCT Pub. Date: Jan. 31, 2019

(65) Prior Publication Data
US 2020/0143788 A1    May 7, 2020

(51) Int. Cl.
*G10K 11/175*     (2006.01)
*G06F 3/16*        (2006.01)
*G08B 5/22*        (2006.01)

(52) U.S. Cl.
CPC .......... *G10K 11/175* (2013.01); *G06F 3/167* (2013.01); *G08B 5/22* (2013.01)

(58) Field of Classification Search
None
See application file for complete search history.

(56) References Cited

U.S. PATENT DOCUMENTS 7,920,822 B2 *  4/2011  Chu ................... H04K 3/825
                                                    455/1
8,972,251 B2     3/2015  Xiang et al.
(Continued)

FOREIGN PATENT DOCUMENTS

CN    2319967    5/1999
CN    1595949    3/2005
(Continued)

OTHER PUBLICATIONS

Meyers, Justin. "How to Completely Turn Off Siri on Your iPhone." Gadget Hacks, Jul. 3, 2017, ios.gadgethacks.com/how-to/siri-101-completely-turn-off-siri-your-iphone-0178572/. (Year: 2017).*
(Continued)

*Primary Examiner* — James K Mooney
(74) *Attorney, Agent, or Firm* — Michael A. Dryja

(57) ABSTRACT

Examples associated with interference generation are described. One example system includes a personal digital assistant. A listening device in the system may receive voice input to control the personal digital assistant. An interference generator integrated with the listening device may generate a noise pattern to prevent the listening device from receiving voice input. An interface for the interference generator may allow a user to activate and deactivate the interference generator and provide a visual indicator describing whether the interference generator is active.

11 Claims, 4 Drawing Sheets

(56) References Cited

U.S. PATENT DOCUMENTS

| | | |
|---|---|---|
| 9,076,425 B2 | 7/2015 | Yoo |
| 9,336,768 B2 | 5/2016 | Soufan et al. |
| 9,392,362 B2 | 7/2016 | Haddad |
| 9,601,102 B2 | 3/2017 | Short et al. |
| 2009/0093211 A1 | 4/2009 | Chu et al. |
| 2011/0198245 A1 | 8/2011 | Soufan |
| 2012/0034904 A1 | 2/2012 | Lebeau et al. |
| 2015/0236743 A1 | 8/2015 | Kennedy |
| 2016/0098983 A1 | 4/2016 | Lehmann |
| 2016/0233912 A1* | 8/2016 | Thomas ............... H05K 9/0069 |
| 2017/0180984 A1 | 6/2017 | Thomas |

FOREIGN PATENT DOCUMENTS

| | | |
|---|---|---|
| CN | 102522080 | 6/2012 |
| CN | 202383998 | 8/2012 |
| EP | 2629194 | 8/2013 |
| KR | 20100131024 | 12/2010 |
| WO | WO-2016111728 | 7/2016 |

OTHER PUBLICATIONS

Byrne, Sue. "Smartphone Apps Can Sound as Good as a White-Noise Machine." consumer reports, Feb. 2, 2016, www.consumerreports.org/home-medical-supplies/smartphone-apps-can-mimic-a-white-noise-machine/. (Year: 2016).*

Cell Phone Anti Eavesdrop Listening Spy Safe Box, 2013, https://www.deluxecctv.com/catalog/anti-phone-tap-devices/cell-phone-anti-eavesdrop-listening-spy-safe-box-2056.html.

CounterTek Cell Phone Safe, 2011, < http://www.pimall.com/nais/cellphonesafe.html >.

* cited by examiner

INTERFERENCE GENERATION

BACKGROUND

Today, personal digital assistants may include network connected artificial intelligences that are increasingly being used by consumers throughout their daily lives to perform a wide variety of tasks. These tasks may range from gathering and providing information (e.g., weather), to controlling other devices connected to the personal digital assistant such as audio devices, televisions, and so forth. Additional functionality is increasingly being added, including the ability to perform purchases, serve as customer support, and so forth. Personal digital assistants can be embedded in existing devices, such as computers, cell phones, and so forth, as well as in dedicated devices for the personal digital assistant. Personal digital assistants may be voice controlled via a microphone on the device housing the personal digital assistants.

BRIEF DESCRIPTION OF THE DRAWINGS

The present application may be more fully appreciated in connection with the following detailed description taken in conjunction with the accompanying drawings.

DETAILED DESCRIPTION

Systems, methods, and equivalents associated with interference generation are described. As discussed above, personal digital assistants may include network connected artificial intelligences that may be controlled by via microphone that listens for voice commands. This presents a security concern as a compromised device having a personal digital assistant may be able to listen in on conversations within the operational proximity of the microphone. Even if a device claims it is not in a listening mode, a compromised device may be able to record and transmit audio across the Internet. This may allow a malicious entity to gather personal and/or other sensitive information about people communicating near a personal digital assistant.

Consequently, a device that includes a personal digital assistant may also include an interference generator integrated with a microphone the device uses to receive voice input. This may allow the interference generator to generate a noise pattern that prevents the microphone from recording or otherwise listening to conversations while the interference generator is active. Because the noise pattern is projected from the device, it is possible to independently verify that the interference generator is operating, and that conversations are not being captured by the device.

Figure 1:
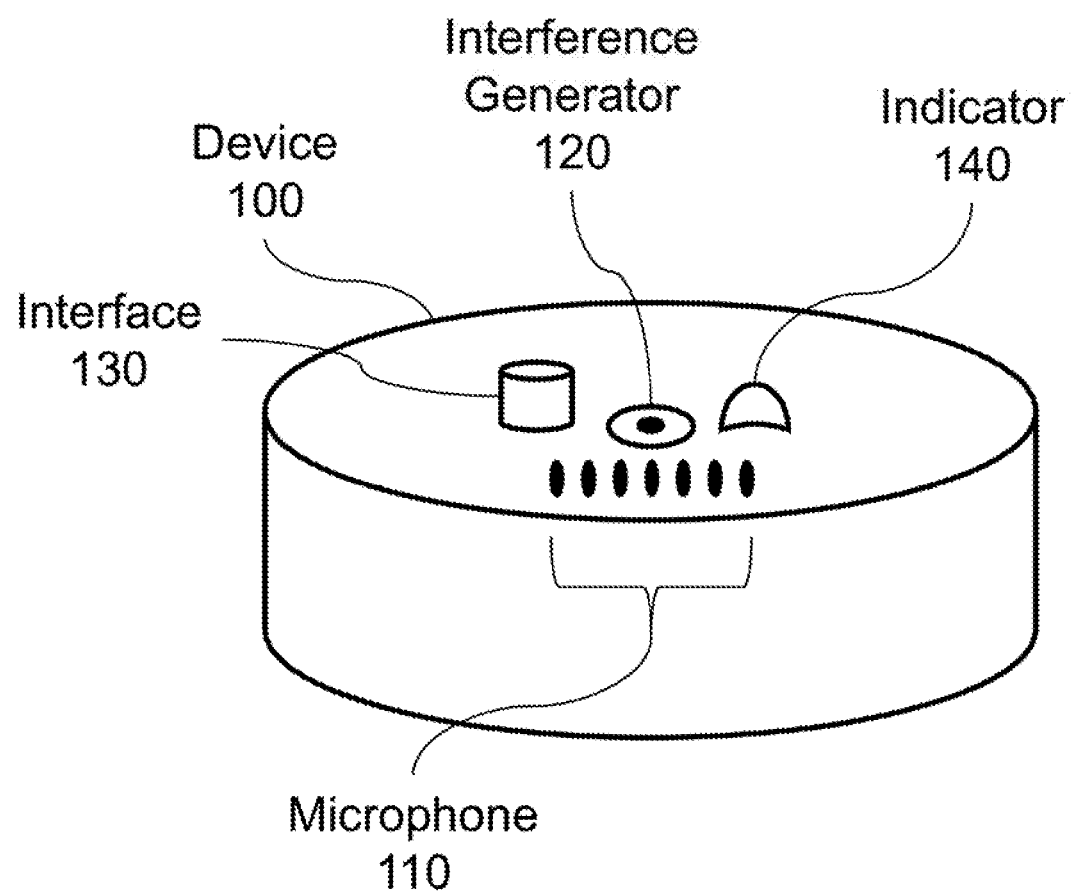
FIG. 1 illustrates an example device associated with interference generation.

FIG. 1 illustrates an example device associated with interference generation. It should be appreciated that the items depicted in FIG. 1 are illustrative examples, and many different systems, devices, and so forth, may operate in accordance with various examples.

FIG. 1 illustrates an example device 100 associated with interference generation. Device 100 may include a personal digital assistant. While a standalone device 100 operating a personal digital assistant is illustrated, techniques described herein may be used in conjunction with other types of devices (e.g., a cell phone or personal computer operating a personal digital assistant). As used herein, a personal digital assistant refers to an application that is designed to perform tasks in response to user instructions received in a natural language format. While instructions received in a natural language format may be received via a variety of techniques (e.g., text input, voice instructions), natural language instructions may be formed using ordinary parts of speech. While specialized instructions may trigger specific actions on the part of a personal digital assistant, much of the interaction between a user and a personal digital assistant may occur by a user asking the personal digital assistant a question and/or by a user commanding the personal digital assistant to perform a task. These questions and commands may be formed using a sequence of words similar to a sequence the person might use to ask or command another person. In some examples, the sequence of words used to control the personal digital assistant may also include a trigger word (e.g., a name of the personal digital assistant), so that the personal digital assistant knows that a question or command is directed to the personal digital assistant. The personal digital assistant may then parse the query or command and respond by taking an appropriate action or by informing the user, again using natural language, that the query or command was not understood.

To detect questions and commands from the user, device 100 may include a microphone 110, at which point a natural language processor of the personal digital assistant may parse spoken words to attempt to understand the question or command. When the question or command is understood, the personal digital assistant may attempt to handle the task requested by the user using internal knowledge, by accessing connected devices, recourses available to device 100 over a network (e.g., the internet) and so forth. However, when device 100 has network access, under various circumstances device 100 may be compromised by malware or another type of attack. These attacks may be delivered, for example, by code hidden within a new functionality a user seeks to add to the personal digital assistant, as a result of a vulnerability exploited using the network connection, and so forth. A compromised device 100 may allow a malicious entity to record voice input detected by device 100 (e.g., via microphone 110). This may occur even when the user has instructed device 100 to temporarily disable its listening features.

Consequently, device 100 also includes an interference generator 120. Interference generator 120 may produce a noise pattern that prevents microphone 110 from being able to understand voices within a location in which device 100 is situated. In various examples, the noise pattern may be randomly generated sound on a frequency range that covers the range of frequencies of the human voice. The noise pattern may include white noise, grey noise, pink noise, and other noise patterns. Additionally, random words and/or tones may also be generated by interference generator 120 to further hinder microphone 110 from detecting speech from users within a proximity of device 100. In various examples, the format of the noise pattern may be randomly varied to prevent filtering of the noise pattern.

In some examples, interference generator 120 may be integrated with device 100 and/or microphone 110. Integration may mean, for example, that interference generator 120 may be built into device 100 in such a way that the proximity of interference generator 120 to microphone 110 allows interference generator to render communications on a human vocal spectrum undetectable by microphone 110 without impacting those communications to other potential listeners (e.g., a speaker and a listener in a room in which device 100 is situated. In other examples, integration may mean that during the manufacturing process of device 100, microphone 110, and/or interference generator 120, these components are built into a single apparatus in a manner that makes it difficult to separate the components from one another, as opposed to being designed to be capable of attaching and/or detaching from one another.

To allow a user to know when interference generator 120 is operating, device 100 also includes an interface 130 and an indicator 140. Interface 130 in this example is illustrated as a button that a user may press to activate and/or deactivate interference generator 120. Indicator 140 may be, for example, a light emitting diode that emits light while interference generator 120 is active.

Because interference generator 120 produces an interference pattern projected from device 100 to prevent microphone 110 from understanding voice commands, another device may be used to independently verify when interference generator 120 is operating. For example, an application may be installed on another device (e.g., a cell phone) that is held near interference generator 120 to confirm that interference generator 120 is active.

In some examples, device 100 may also include a set of sensors (not shown). The sensors may detect various properties regarding a location in which device 100 is situated. These properties may relate to, for example, whether device 100 is in an interior or exterior location, a size of the location, an ambient noise level of the location, and so forth. Based on these properties, interference generator 120 may vary properties of the noise pattern generated to interfere with sound. For example, a larger room or louder ambient noise level may warrant a louder noise pattern as speakers may raise their voices under these circumstances, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

Figure 2:
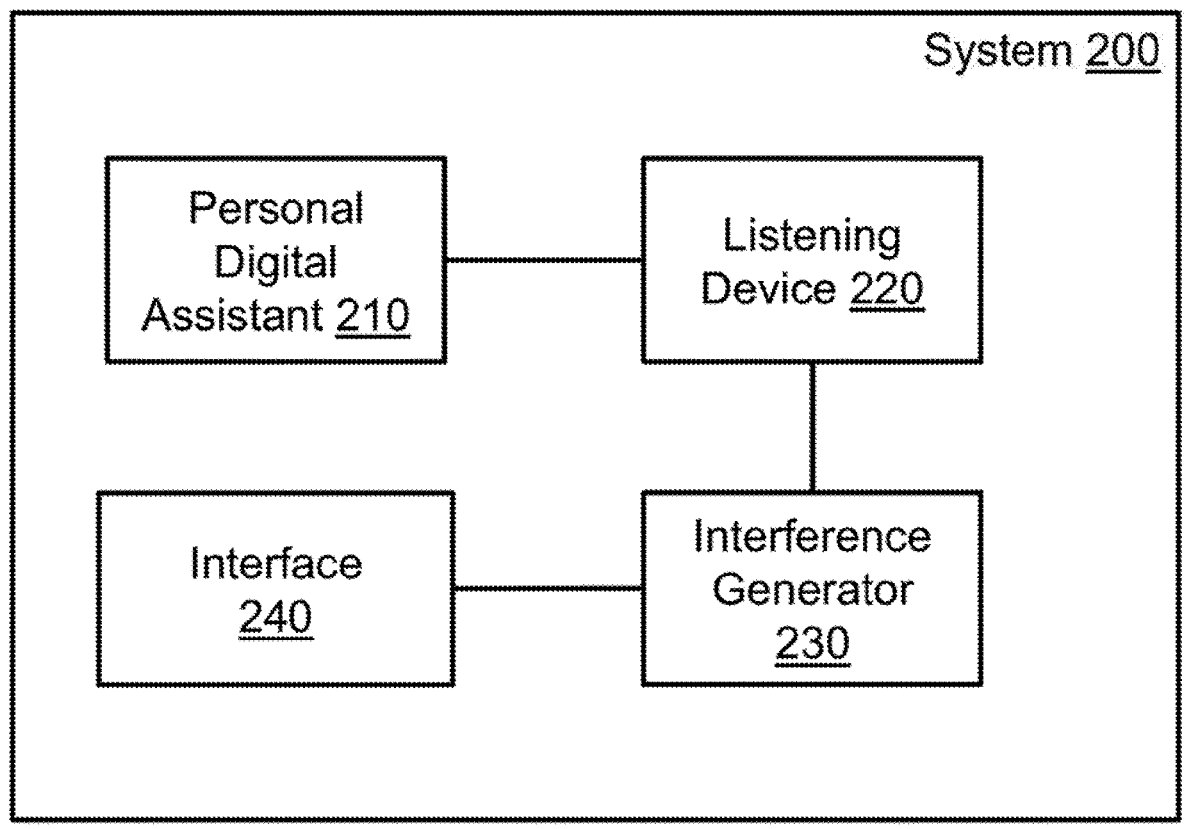
FIG. 2 illustrates an example system associated with interference generation.

FIG. 2 illustrates an example system 200 associated with interference generation. System 200 includes a personal digital assistant 210. The personal digital assistant may be an artificial intelligence configured to perform tasks and provide information in response to questions and commands received in a natural language format.

System 200 also includes a listening device 220. Listening device 220 may receive voice input to control personal digital assistant 210. Listening device 220 may be, for example, a microphone. The voice input may be, for example, spoken questions and/or commands from a user located nearby system 200.

System 200 also includes an interference generator 230. Interference generator 230 may be integrated with listening device 220. Interference generator 230 may generate a noise pattern to prevent listening device 220 from receiving voice input. The noise pattern may include, for example, white noise, grey noise, pink noise, randomly generated spoken words, randomly generated tones, and so forth. To hinder filtering of the noise pattern, interference generator 230 may randomly vary a property of the noise pattern. The property of the noise pattern may be the frequency of the noise pattern. In some examples, system 200 may include multiple listening devices 220 and interference generators. In this example, each interference generator may be integrated with a respective listening device to prevent that respective listening device from receiving voice input.

System 200 also includes an interface 240 for interference generator 230. Interface 240 may allow a user to activate and deactivate interference generator 230. Interface 240 may also provide a visual indicator describing whether interference generator 230 is active.

In some examples, system 200 may include a set of sensors (not shown). The set of sensors may detect properties of a location in which system 200 is situated. Thus, interference generator 230 may adjust a property of the noise pattern generated based on the properties of the location. The property of the location may be, for example, a size of the location, whether the location is indoors or outdoors, an ambient noise level of the location, and so forth. The property of the noise pattern may be a volume of the noise pattern.

Figure 3:
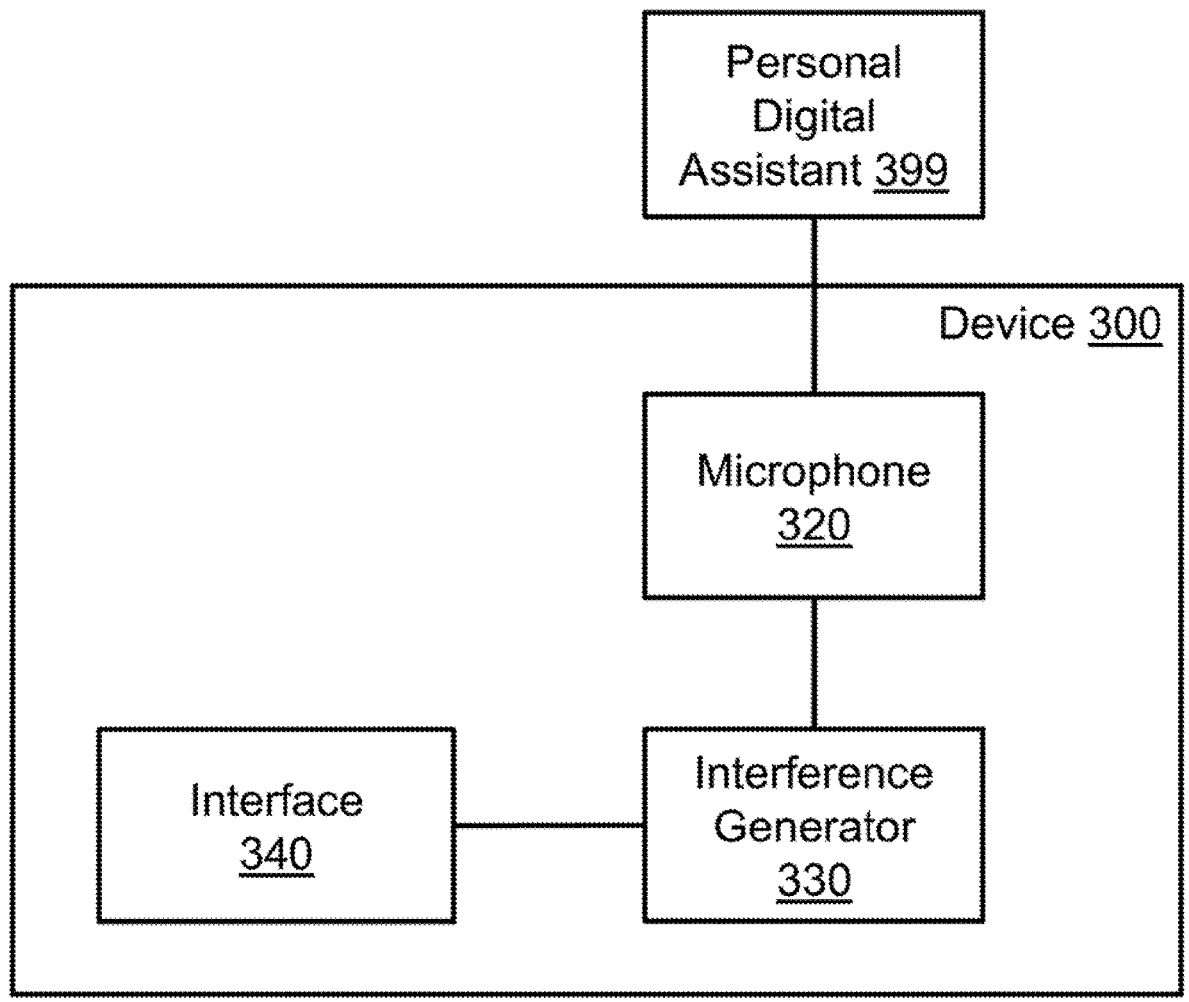
FIG. 3 illustrates another example device associated with interference generation.

FIG. 3 illustrates a device 300. Device 300 includes a microphone 320. Microphone 320 may receive audio input to control a personal digital assistant 399. In this example, personal digital assistant 399 is illustrated as being external to device 300. This may be because some functions performed by personal digital assistant 399 are performed by a device or system external to device 300. For example, some processing of audio input received by microphone 320, analysis, and so forth may be performed by a device connected directly or via a network to device 300.

Device 300 also includes an interference generator 330. Interference generator 330 may generate a noise pattern to prevent microphone 320 from receiving the audio input. Interference generator 330 may be integrated within device 300 within a proximity to microphone 320 that allows the noise pattern to be generated at a volume that does not interfere with auditory communications in a location in which device 300 is situated. The volume that does not interfere with auditory communications in a device in which the device is situated may be a volume that is undetectable by human ears that are farther than a predefined distance from interference generator 330. In some examples, interference generator may also generate a signal that interferes electrically with signals received by microphone 320.

Device 300 also includes an interface 340 for interference generator 330. Interface 340 may allow a user to activate and deactivate interference generator. Interface 340 may also provide a visual indicator describing whether interference generator 330 is active. In some examples, interface 340 may prevent reactivation of the interference generator unless a user physically interacts with device 300 (e.g., by interacting with interface 340. In various examples, this may prevent malicious code from covertly deactivating the interference generator to listen into conversations. This may be achieved by, for example, a switch that can only be disabled via a physical contact with the device, by restricting the ability to disable the interference generator to physical inputs, and so forth. Preventing deactivation of the interference generator except by physical input may be achieved even when a non-physical input is accepted to activate the interference generator.

Figure 4:
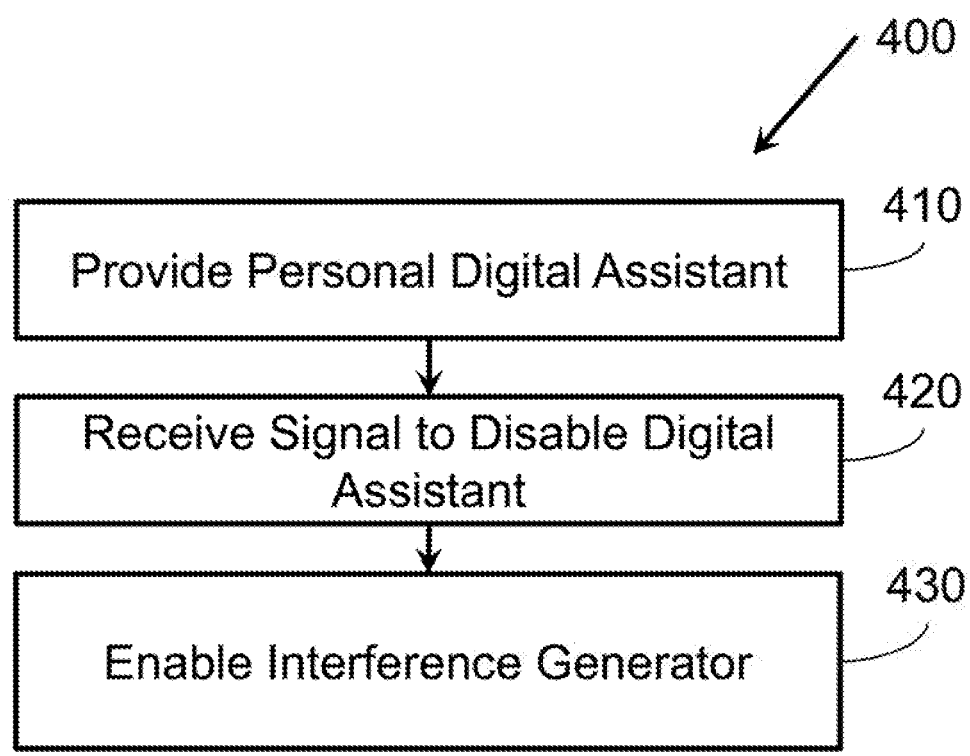
FIG. 4 illustrates a flowchart of example operations associated with interference generation.

FIG. 4 illustrates an example method 400. Method 400 may be embodied on a non-transitory processor-readable medium storing processor-executable instructions. The instructions, when executed by a processor, may cause the processor to perform method 400. In other examples, method 400 may exist within logic gates and/or RAM of an application specific integrated circuit (ASIC).

Method 400 may perform various tasks associated with interference generation. Method 400 may be performed by a device containing a personal digital assistant. The device may be, for example, a phone, a laptop, a standalone device, and so forth. Method 400 includes providing, via the device, a personal digital assistant at 410. The personal digital assistant may perform functions in response to voice commands received via a microphone of the device. In various examples, the personal digital assistant may be provided via various hardware, firmware, software, and so forth, components of the device.

Method 400 also includes receiving a signal at 420. The signal may indicate a desire to disable the personal digital assistant. The signal indicating a desire to disable the personal digital assistant may be received via, for example, a voice command, an electric signal, a physical interface on the device, and so forth. In response to the signal, method 400 includes enabling an interference generator at 430. The interference generator may be integrated into the device proximate to the microphone. The interference generator may generate a noise pattern to prevent the microphone from detecting voice commands. The noise pattern may include, for example, white noise, grey noise, pink noise, randomly generated spoken words, and so forth. The interference generator may also randomly vary a property of the noise pattern to hinder filtering the noise pattern. A visual indicator may be provided while the interference generator is enabled.

In some examples method 400 may also include disabling the personal digital assistant. Disabling the personal digital assistant may facilitate conserving resources used by the device while a user does not want the personal digital assistant to be active. In some examples, method 400 may also include receiving a signal indicating a desire to re-enable the personal digital assistant. When this signal is received, the interference generator may be disabled, and the personal digital assistant may be re-enabled.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A system comprising:
  a personal digital assistant;
  a listening device of the personal digital assistant to receive voice input to control the personal digital assistant;
  an interference generator integrated with the listening device to generate and audibly output a noise pattern to prevent the listening device from receiving voice input; and
  an interface for the interference generator to allow a user to activate and deactivate the interference generator and to provide a visual indicator describing whether the interference generator is active,
  wherein the interface accepts non-physical input to activate the interference generator but only accepts physical input to deactivate the interference generator.

2. The system of claim 1, comprising a set of sensors to detect a property of a location in which the system is situated, and where the interference generator adjusts a property of the noise pattern generated based on the property of the location.

3. The system of claim 2, where the property of the location is a size of the location, and where the property of the noise pattern is a volume of the noise pattern.

4. The system of claim 1, where the system comprises a set of listening devices, and a set of interference generators, where each interference generator is integrated with a respective listening device.

5. The system of claim 1, where the noise pattern includes at least one of, white noise, grey noise, pink noise, and randomly generated spoken words.

6. The system of claim 1, where the interference generator randomly varies a property of the noise pattern to hinder filtering of the noise pattern.

7. The system of claim 6, where the property of the noise pattern is a frequency of the noise pattern.

8. A device comprising:
  a microphone to receive audio input to control the device;
  an interference generator to generate and audibly output a noise pattern to prevent the microphone from receiving the audio input, where the interference generator is integrated within the device within a proximity to the microphone that allows the noise pattern to be generated at a volume that does not interfere with auditory communications in a location in which the device is situated; and
  an interface for the interference generator to allow a user to activate and deactivate the interference generator and to provide a visual indicator describing whether the interference generator is active,
  wherein the interface accepts non-physical input to activate the interference generator but only accepts physical input to deactivate the interference generator.

9. The device of claim 8, where the volume that does not interfere with auditory communications in a location in which the device is situated is a volume that is undetectable by human ears that are farther than a predefined distance from the interference generator.

10. A method comprising:
  providing a device that performs functions in response to voice commands received via a microphone of the device;
  enabling, via an interface of the device accepting non-physical input, an interference generator integrated in the device proximate to the microphone, where the interference generator generates and audibly outputs a noise pattern to prevent the microphone from detecting voice commands; and disabling, only via the interface accepting physical input, the interference generator.

11. The method of claim 10, where the noise pattern includes at least one of, white noise, grey noise, pink noise, and randomly generated spoken words, and where the interference generator randomly varies a property of the noise pattern to hinder filtering of the noise pattern.

* * * * *